UNITED STATES PATENT OFFICE.

ERNST JACOBY, OF MUNICH, GERMANY, ASSIGNOR TO THE FIRM OF DIAMALT AKTIEN-GESELLSCHAFT, OF MUNICH, BAVARIA, GERMANY.

BAKING-POWDER.

1,058,980.　　　　　Specification of Letters Patent.　　Patented Apr. 15, 1913.

No Drawing.　　Application filed August 1, 1912.　Serial No. 712,760.

*To all whom it may concern:*

Be it known that I, ERNST JACOBY, subject of the Emperor of Germany, residing at Sonnenstrasse 7, Munich, Bavaria, Germany, have invented certain new and useful Improvements in Baking-Powder, of which the following is a specification.

My invention relates to improvements in baking powder, and refers to a novel method of producing baking powder and the article so produced.

It has heretofore been proposed to employ hydrogen peroxid or other peroxids as substitutes for baking powder, but the commercially available peroxids, viz:—barium peroxid, sodium peroxid, and magnesium peroxid are not suitable for the purpose inasmuch as barium peroxid is poisonous, sodium peroxid is explosive, and magnesium peroxid would cause the dough to turn into a hard mass. Hydrogen peroxid decomposes too readily and requires so large a quantity of water for its dilution as to render its use as baking powder impracticable; moreover it is necessary to add a catalytic agent in order to completely decompose the hydrogen peroxid in the dough.

The primary object of my invention is to avoid the difficulties above pointed out in the production of baking powder, and to that end the essential feature of my invention consists in the employment of persalts in the production of baking powder, the persalts serving either as entire or partial substitutes for the gas evolving salts heretofore employed. The persalts which I use are percarbonates, persulfates, perphosphates and perborates, and by the term "persalts" as herein employed, I designate salts which, without changing their inherent chemical properties or characteristics, relatively readily yield oxygen when subjected to suitable treatment, such as being heated. Catalytic agents may, or may not, be used in the treatment of such persalts. Persalts may be easily produced in different ways. By the addition of hydrogen peroxid to salts, or by the combination of peroxids with acids, such substances as sodium percarbonate, sodium perphosphate and perborates may be produced, and by electrolysis of acids it is possible to produce percarbonic acids and persulfuric acids, which are then neutralized. Finally, such persalts as ammonium persulfate, sodium percarbonate, and the like, may be obtained by the electrolysis of salt solutions. Primarily, percarbonates may be employed, and in some cases persulfates, perborates, etc., are available. The acid evolving action of these salts is well known, but so far as I am aware persalts have not heretofore been used in the production of baking powders.

In the use of baking powder produced with the aid of persalts and containing the usual organic or inorganic acids, oxygen is liberated which has a very beneficial effect on the color and baking qualities of the flour, and improves the taste and digestive properties of the baked product.

Following are a number of examples showing the composition of baking powders containing persalts as constituents:

*Example I—Baking powder made of percarbonates and inorganic acids.*—With 100 kg. flour intimately admix ½ kg. sodium carbonate and knead into the mixture 2.1 kg. muriatic acid of 1.063 specific gravity. Let the dough stand for ¼ to ¾ of an hour before baking.

*Example II—Baking powder made of percarbonates and organic acids.*—This mixture consists of 33 g. sodium percarbonate, 36 g. pyrotartaric acid, 47.3 g. wheat starch.

*Example III—Mixtures of persalts and ordinary baking powders.*—(a) The following mixture has been found to be effective: 19 parts of tartar, 14 parts of double carbonate of sodium, 16 parts of starch flour, 4 parts of natron percarbonate.

(b) A more strongly acting mixture may consist of 16.5 g. sodium percarbonate, 17 g. double carbonate of sodium, 25 g. pyrotartaric acid, 50 g. wheat starch.

(c) The well known Horsford baking powder may be constituted as follows:—400 parts double carbonate of sodium, 100 parts sodium percarbonate, 443 parts chlorid of potassium.

In the preparation of these baking powders, the quantity of acid powder to be used is largely determined by experiment.

The examples above given may be modified in their constituents, according to the character of the flour, the ingredients used in baking, or the requirements of the user.

With the exception of the baking powder last named, the other mixtures may, if the substances are thoroughly dried, be incorporated in a baking powder mixture. It may be noted in this connection that a very slight excess of acid in the baking powder suffices, only just enough being necessary to carefully neutralize the quantity of alkali employed and to prevent any possible alkaline reaction in the dough, as such alkaline reaction would tend to injure the baked product. The evolution of acid begins in the dough through the catalytic action of the flour and is entirely completed through the heat of the bake oven. This is particularly important and beneficial as in this manner the desired raising quality is imparted to the baking powder in the oven.

The baking powder produced according to my invention is used in the ordinary manner and no description thereof is deemed necessary.

Having thus described my invention what I desire to secure by Letters Patent is:—

1. The herein described method of producing baking powder which consists in admixing a suitable gas evolving oxygen yielding persalt with acid.

2. The herein described method of producing baking powder which consists in admixing an oxygen yielding percarbonate with acid.

3. As a new article of manufacture, a baking powder containing an oxygen yielding persalt.

4. As a new article of manufacture, a baking powder containing an oxygen yielding percarbonate.

In testimony whereof I affix my signature in presence of two witnesses.

ERNST JACOBY.

Witnesses:
RICHARD LEMP,
MATHILDE K. HELA.